US010209611B2

(12) United States Patent
Eskolin et al.

(10) Patent No.: US 10,209,611 B2
(45) Date of Patent: Feb. 19, 2019

(54) APPARATUSES AND METHODS FOR PROVIDING LIGHT

(71) Applicant: Nokia Technologies Oy, Espoo (FI)

(72) Inventors: Jan Eskolin, Pirkkala (FI); Petri Piippo, Lempaala (FI); Toni Jarvenpaa, Akaa (FI); Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/552,659

(22) PCT Filed: Feb. 5, 2016

(86) PCT No.: PCT/FI2016/050073
§ 371 (c)(1),
(2) Date: Aug. 22, 2017

(87) PCT Pub. No.: WO2016/135376
PCT Pub. Date: Sep. 1, 2016

(65) Prior Publication Data
US 2018/0046070 A1    Feb. 15, 2018

(30) Foreign Application Priority Data
Feb. 23, 2015 (EP) ..................... 15156064

(51) Int. Cl.
*G03B 21/20* (2006.01)
*G02B 5/30* (2006.01)
(Continued)

(52) U.S. Cl.
CPC ........... *G03B 21/2073* (2013.01); *G02B 5/30* (2013.01); *G02B 27/017* (2013.01);
(Continued)

(58) Field of Classification Search
CPC ..................... G03B 21/006; G03B 21/208; G03B 21/2006; G03B 21/2053; G03B 21/2073;
(Continued)

(56) References Cited

U.S. PATENT DOCUMENTS 8,746,890 B2 *  6/2014  Ishimatsu ............ G02B 5/3058
349/7
8,746,892 B2 *  6/2014  Goto .................. G02B 27/0983
353/30
(Continued)

FOREIGN PATENT DOCUMENTS

EP     1 098 537 A2    5/2001
JP     H 09-265070    10/1997

*Primary Examiner* — Sultan Chowdhury
(74) *Attorney, Agent, or Firm* — Harrington & Smith (57) ABSTRACT

An apparatus including a light source; a pixel control element; and an input transmission polarizer configured to: polarize incident light from the light source into transmitted first and second light portions, wherein the first light portion has a first polarization and the second light portion has a second polarization and wherein the first and second polarizations are orthogonal; to provide the first light portion as input to the pixel control element; and to output the second light portion to provide the second light portion for illumination.

20 Claims, 3 Drawing Sheets

(51) Int. Cl.
*G02B 27/28* (2006.01)
*G02F 1/01* (2006.01)
*G02B 27/01* (2006.01)

(52) U.S. Cl.
CPC ....... *G02B 27/0172* (2013.01); *G02B 27/283* (2013.01); *G02F 1/0136* (2013.01); *G02B 2027/0118* (2013.01)

(58) Field of Classification Search
CPC .. H04N 9/3105; H04N 9/3167; H04N 13/004; H04N 13/0044; H04N 13/0438; H04N 13/0459
See application file for complete search history.

(56) References Cited

U.S. PATENT DOCUMENTS

| | | | |
|---|---|---|---|
| 2008/0018558 A1* | 1/2008 | Kykta | G03B 21/567 345/58 |
| 2009/0059172 A1* | 3/2009 | Hsu | G02B 27/2264 353/8 |
| 2009/0279055 A1* | 11/2009 | Amano | G03B 3/00 353/101 |
| 2010/0110383 A1 | 5/2010 | Tang | 353/8 |
| 2011/0273906 A1 | 11/2011 | Nichol et al. | 362/607 |
| 2012/0008105 A1* | 1/2012 | Katou | G03B 21/2033 353/85 |

* cited by examiner

APPARATUSES AND METHODS FOR PROVIDING LIGHT

TECHNOLOGICAL FIELD

Examples of the disclosure relate to apparatuses and methods for providing light. For example, examples of the disclosure relate to apparatuses and methods for providing light in a display apparatus such as a near eye display apparatus.

BACKGROUND

Some display apparatuses utilize polarized light. Such display apparatuses are arranged so that in operation they are provided with polarized light which may then, for example, be provided to an eye or eyes of a user.

In some examples display apparatuses that utilize polarized light may form part of a near eye display such as a head mounted display.

BRIEF SUMMARY

According to various, but not necessarily all, examples of the disclosure there is provided an apparatus comprising:
  a light source;
  a pixel control element; and
  an input transmission polarizer configured to:
polarize incident light from the light source into transmitted first and second light portions, wherein the first light portion has a first polarization and the second light portion has a second polarization and wherein the first and second polarizations are orthogonal;
to provide the first light portion as input to the pixel control element; and
to output the second light portion to provide the second light portion for illumination.

According to various, but not necessarily all, examples of the disclosure there is provided a method comprising:
providing a light source;
providing a pixel control element; and
providing an input transmission polarizer configured to:
polarize incident light from the light source into transmitted first and second light portions, wherein the first light portion has a first polarization and the second light portion has a second polarization and wherein the first and second polarizations are orthogonal;
to provide the first light portion as input to the pixel control element; and
to output the second light portion to provide the second light portion for illumination.

According to various, but not necessarily all, examples of the disclosure there is provided an apparatus comprising:
  light providing means;
  pixel control means; and
  input transmission polarizing means for:
polarizing incident light from the light source into transmitted first and second light portions, wherein the first light portion has a first polarization and the second light portion has a second polarization and wherein the first and second polarizations are orthogonal;
providing the first light portion as input to the pixel control element; and
outputting the second light portion to provide the second light portion for illumination.

According to various, but not necessarily all, examples of the disclosure there is provided a method comprising:
polarizing incident light from a light source into transmitted first and second light portions, wherein the first light portion has a first polarization and the second light portion has a second polarization and wherein the first and second polarizations are orthogonal;
providing the first light portion as input to a pixel control element; and
outputting the second light portion to provide the second light portion for illumination.

According to various, but not necessarily all, examples of the disclosure, there is provided an apparatus comprising means for performing the method as described in the paragraph above.

According to various, but not necessarily all, examples of the disclosure there is provided a method comprising:
using a polarizing beam splitter to simultaneously polarize incident light from a light source into transmitted first and second light portions, wherein the first light portion has a first polarization and the second light portion has a second polarization and wherein the first and second polarizations are orthogonal;
to provide the first light portion as input to a pixel control element; and
to output the second light portion to provide the second light portion for illumination.

According to various, but not necessarily all, examples of the disclosure there is provided an apparatus comprising means for performing the method as described in the paragraph above.

BRIEF DESCRIPTION

For a better understanding of various examples that are useful for understanding the brief description, reference will now be made by way of example only to the accompanying drawings in which.

DETAILED DESCRIPTION

Examples of the disclosure relate to providing light in an apparatus, which may for example comprise a display apparatus. In some examples unpolarized light from a light source is polarized into a first light portion having a first polarization and a second light portion having a second polarization orthogonal to the first polarization. The first light portion is provided to a pixel control element, configured to operate using polarized incident light, and then may be transmitted onwards to an eye or eyes of a user and the second light portion is provided for illumination. In some examples the second light portion may be provided for illumination external to the apparatus.

In examples of the disclosure the second light portion having the second polarization that is not utilized by the pixel control element is not blocked and wasted but used for an illumination function. This provides the technical effect of, for example, an energy efficient apparatus.

FIGS. 1 to 4 illustrate an apparatus 10 comprising a light source 12; a pixel control element 14; and an input transmission polarizer 16 configured to: polarize incident light 18 from the light source 12 into transmitted first and second light portions 20, 24 wherein the first light portion 20 has a first polarization and the second light portion 24 has a second polarization and wherein the first and second polarizations are orthogonal; to provide the first light portion 20 as input to the pixel control element 14; and to output the second light portion 24 to provide the second light portion 24 for illumination.

In some examples, the apparatus 10 may be for use in a near eye display.

Figure 5:
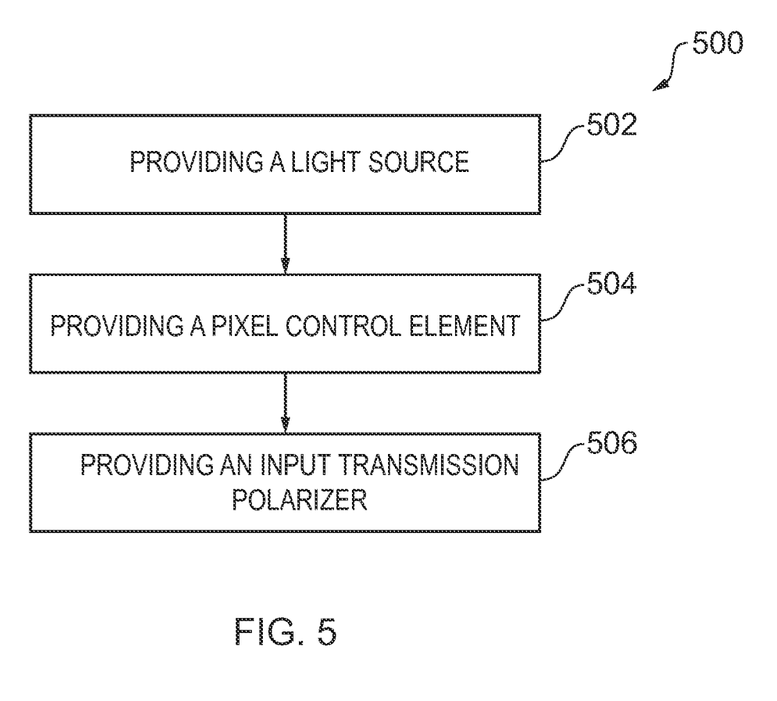
FIG. 5 illustrates an example of a method.

FIG. 5 illustrates a method 500 comprising: providing a light source 12; providing a pixel control element 14; and providing an input transmission polarizer 16 configured to: polarize incident light 18 from the light source 12 into transmitted first and second light portions 20, 24, wherein the first light portion 20 has a first polarization and the second light portion 24 has a second polarization and wherein the first and second polarizations are orthogonal; to provide the first light portion 20 as input to the pixel control element 14; and to output the second light portion 24 to provide the second light portion 24 for illumination.

Figure 1:
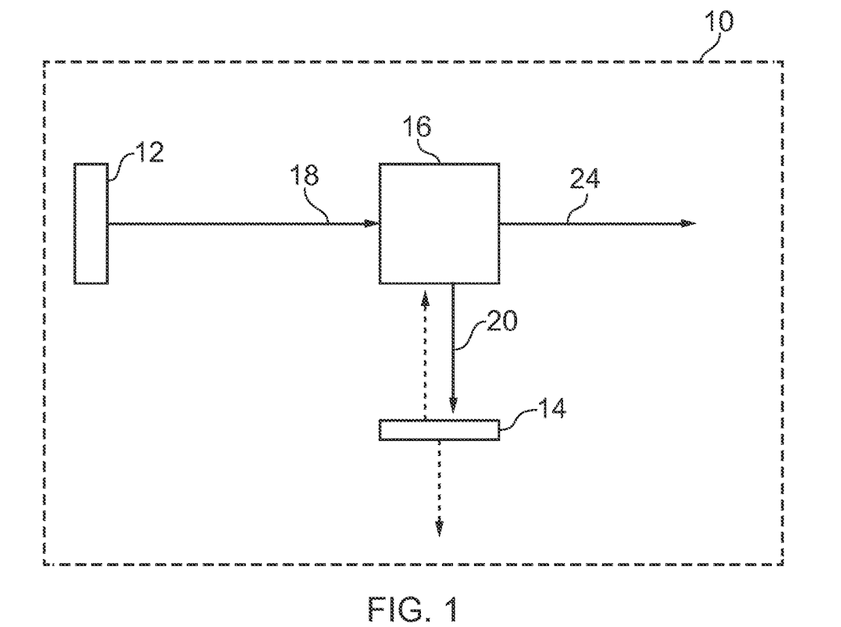
FIG. 1 illustrates an example of an apparatus.

FIG. 1 schematically illustrates an example of an apparatus 10. In the illustrated example, the apparatus 10 comprises a light source 12, a pixel control element 14 and an input transmission polarizer 16.

The light source 12 is configured to output light as an input to the input transmission polarizer 16. The light source 12 may be/comprise any suitable light source 12 such as any suitable source of unpolarized light. For example, the light source 12 may comprise one or more light emitting diodes (LEDs), one or more high pressure discharge lamps and/or one or more LED hybrid light sources and so on.

In the example of FIG. 1, the input transmission polarizer 16 is configured to polarize incident light 18 from the light source 12 into transmitted first and second light portions 20, 24. In examples, the first light portion 20 may have a first polarization and the second light portion 24 may have a second polarization orthogonal to the first polarization.

The first and second polarizations may be considered first and second polarizations of the input transmission polarizer 16 as the input transmission polarizer 16 may be configured to polarize incident light into the first and second polarizations.

The input transmission polarizer 16 may also be configured to direct polarized incident light, having the first polarization in a first direction and polarized incident light having the second polarization in a second direction, different to the first direction.

In the example of FIG. 1, the input transmission polarizer 16 is configured to provide the first light portion 20 as input to the pixel control element 14 and to output the second light portion 24 to provide the second light portion 24 for illumination In examples the input transmission polarizer 16 may be/comprise any component or components configured to provide this functionality. For example the input transmission polarizer may be/comprise a polarizing beam splitter 28 (see, for example, FIG. 2), a polarizing plate beam splitter, a polarizing pellicle plate beam splitter and/or a diffractive beam splitter and so on.

The pixel control element 14 may comprise a plurality of pixels and may be configured to utilize polarized light.

In examples such as the example of FIG. 1 the pixel control element 14 is configured to receive the first light portion 20 from the input transmission polarizer 16 and to selectively control the polarization of the first light portion 20 according to the state of pixels of the pixel control element 14.

For example the pixel control element 14 may rotate the polarization of the first light portion 20 depending on what is displayed on the pixels of the pixel control element 14. In some examples, the polarization of the first light portion 20 may be rotated by 90° for pixels which are bright and by 0° for pixels which are dark.

Figure 3:
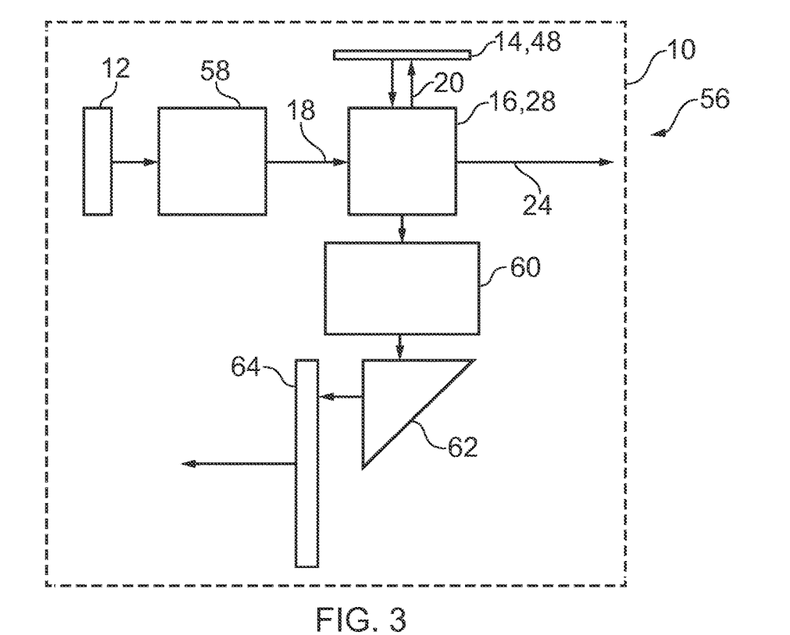
FIG. 3 illustrates an example of an apparatus.

In some examples, the pixel control element 14 may be a reflective pixel control element as illustrated in the example of FIG. 1 by the dashed arrow pointing from the pixel control element 14 back towards the input transmission polarizer 16 (see, for example, FIG. 3). For example, the pixel control element 14 may comprise a reflective microdisplay such as a liquid crystal on silicone (LCOS) display and/or a digital light processing (DLP) display.

In some examples the pixel control element 14 may be configured to transmit the first light portion 20 onwards as illustrated in the example of FIG. 1 by the dashed arrow pointing downwards from the pixel control element 14.

In some examples the pixel control element 14 may comprise a transmissive microdisplay such as a transmissive liquid crystal microdisplay and/or a transmissive liquid crystal on silicone (LCOS) display.

As used herein a microdisplay is a miniaturized display. In some examples a microdisplay may have a screen size less than 2 inches diagonally. A microdisplay may be, for example, suitable for use in a near eye display such as a head mounted display and/or a viewfinder.

Figure 2:
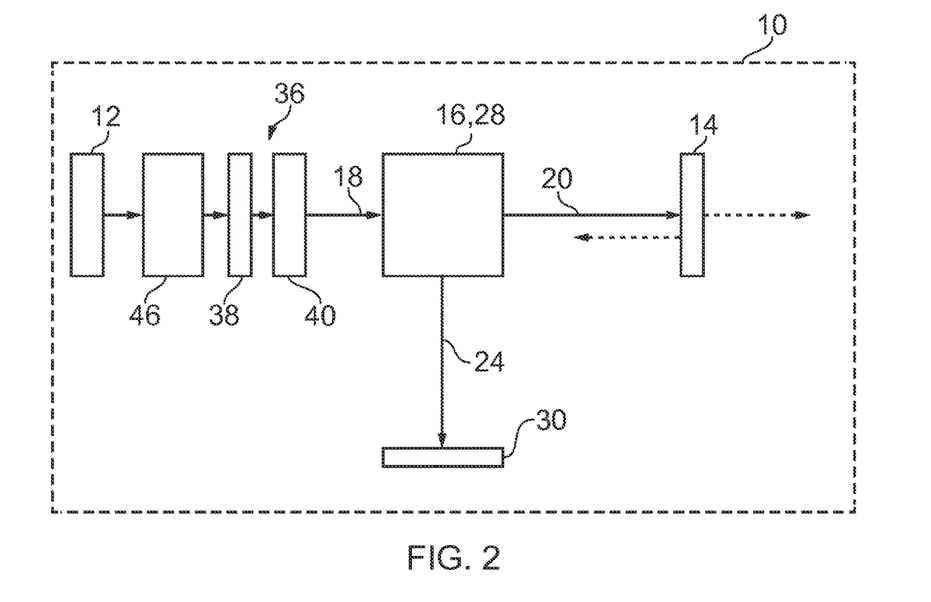
FIG. 2 illustrates an example of an apparatus.

In examples, the apparatus 10 may comprise a number of additional components not illustrated in the example of FIG. 1 (see, for example, the example of FIG. 2).

In examples, there may be any number of intervening components between the components illustrated in the example of FIG. 1, including no intervening components. For example, there may be one or more components between the light source 12 and the input transmission polarizer 16.

However, in such examples, the light source 12 is still considered to provide light to the input transmission polarizer 16. That is, in some examples the light may be transmitted directly or indirectly between any of the components illustrated and described in the examples herein.

Additionally or alternatively one or more of the components illustrated in the example of FIG. 1 may be integrated and/or combined with one or more components illustrated and/or additional components not illustrated in the example of FIG. 1.

In use, the light source 12 provides light to the input transmission polarizer 16. This is illustrated in the example of FIG. 1 by the arrow from the light source 12 to the input transmission polarizer 16. The arrows illustrated in the figures are schematic illustrations of a light path.

The light from the light source 12 is incident upon the input transmission polarizer 16. The input transmission polarizer 16 polarizes the incident light 18 from the light source 12 into a first light portion 20 and a second light portion 24.

The first light portion 12 has a first polarization and, in the example of FIG. 1, is directed downwards towards the pixel control element 14.

The second light portion 24 has a second polarization, orthogonal to the first polarization, and, in the example of FIG. 1, is output straight through the input transmission polarizer 16. This is illustrated in the example of FIG. 1 by the arrow to the right from the input transmission polarizer 16.

In examples, the first light portion 20 and second light portion 24 may be provided in any direction from the input transmission polarizer 16. For example, the first light portion 20 may be provided in the direction of the second light portion in FIG. 1 and vice versa (see for example, FIG. 2).

In some examples, the first light portion 20 may be provided at a first angle from an arbitrary axis and the second light portion 24 may be provided at a second angle from the arbitrary axis, different to the first angle. The first and second angles may or may not be orthogonal to each other.

The second light portion 24 may be provided for illumination. For example, the second light portion 24 may be provided for illumination external to the apparatus 10 such as, as a flashlight and/or flash for a camera and/or other device. In some examples, the camera and/or other device may form part of the apparatus 10 or may be separate from the apparatus 10.

In examples, the second light portion 24 may be provided for any illumination function internal and/or external to the apparatus 10. This is advantageous as it provides for the polarization that is not utilized by the pixel control element 14 not being blocked and wasted as heat.

In some examples, the apparatus 10 may comprise one or more further components to further control the second light portion 24. For example, the apparatus 10 may comprise one or more additional lenses to shape the external beam of light provided by the second light portion 24. Additionally, or alternatively the apparatus 10 may comprise additional component(s) to further direct and/or manipulate the second light portion 24.

In examples, such as that illustrated in FIG. 1 the first light portion 20 is provided to the pixel control element 14 as input.

The pixel control element 14 selectively controls the polarization of the first light portion 20 according to the state of the pixels of the pixel control element 14. In some examples, the pixel control element 14 may reflect and/or transmit the first light portion 20 depending on the configuration of the pixel control element 14.

In examples, the input transmission polarizer 16 may be located between the light source 12 and the pixel control element 14. The input transmission polarizer 16 may be physically located between the light source 12 and the pixel control element 14 and/or located between the light source 12 and the pixel control element 14 in the light path (see, for example, FIG. 1).

The apparatus 10 may comprise a near-eye display. In examples, the apparatus 10 may comprise a head mounted display such as smart eye wear.

FIG. 2 schematically illustrates a further example of an apparatus 10. In the example of FIG. 2, the apparatus 10 comprises the components described above in relation to the example of FIG. 1, and these components may be as described in the example of FIG. 1.

In the example of FIG. 2, the directions of the first and second light portions 20, 24 have been swapped. Accordingly, in the example of FIG. 2 the pixel control element 14 is located to the right of the input transmission polarizer 16.

In the example of FIG. 2, the input transmission polarizer 16 is a polarizing beam splitter 28 and the apparatus 10 further comprises a polarization recycler 46, a polarization controller 36 and a control mechanism 30. In the example of FIG. 2, the polarization controller 36 comprises a polarizer 38 and a controllable polarization rotator 40.

The polarization controller 36 may be configured to receive light from the light source 12 as an input and to selectively output light having the first or second polarization of the polarizing beam splitter 28 as an input to the input transmission polarizer 16.

In examples, such as the example of FIG. 2, the polarizer 38 is configured to polarize light from the light source 12 prior to the light from the light source 12 being incident upon the polarizing beam splitter 28. The polarizer 38 may be considered a prepolarizer, initial polarizer and/or further polarizer.

The polarizer 38 may be configured to polarize light from the light source 12 into any polarization state. For example, the polarizer 38 may be configured to polarize light from the light source 12 into the first or second polarization of the polarizing beam splitter 28.

In examples, the polarizer 38 may be configured to block and/or redirect and/or reflect the unselected polarization of light from the light source 12.

The polarizer 38 may comprise any suitable component or components. For example, a wire-grid polarizer and so on.

In the example of FIG. 2, the controllable polarization rotator 40 is configured to receive light from the polarizer 38 and to output light towards the polarizing beam splitter 28. In the example, the controllable polarization rotator 40 is configured to selectively rotate the polarization of the light from the polarizer 38.

For example, the controllable polarization rotator 40 may be configured to controllably rotate the polarization of the light from the polarizer 38 from the first polarization of the polarizing beam splitter 28 to the second polarization of the polarizing beam splitter 28 or vice versa.

The controllable polarization rotator 40 may also be configured to allow the light from the polarizer 38 to pass through without rotation of the polarization.

In some examples, the light from the polarizer 38 may not be in the first or second polarization of the polarizing beam splitter 28 and the controllable polarization rotator 40 may be configured to selectively rotate the polarization of light from the polarizer 38 into the first or second polarizations of the polarizing beam splitter 28.

The polarization controller 36, which in the example of FIG. 2 comprises the polarizer 38 and the controllable polarization rotator 40, may be configured to controllably select in which polarization the light 18 is incident upon the polarizing beam splitter 28. For example, the polarization controller 36 may be configured to select whether the light 18 incident upon the polarizing beam splitter 28 is in the first or second polarization of the polarizing beam splitter 28. The polarization controller 36 may therefore be configured to control whether light from the light source 12 is provided as the first light portion 20 or the second light portion 24 or how much light is provided in the first light portion 20 and the second light portion 24.

This is because the input transmission polarizer 16, which in the example of FIG. 2 is a polarizing beam splitter, may be configured to provide polarized incident light having the first polarization to the pixel control element 14 and to output polarized incident light having the second polarization for illumination.

In examples, the polarization controller 36 may be configured to select, by controlling the polarization of light incident upon the input transmission polarizer 16, whether light from the light source is provided as the first light portion 20 to the pixel control element 14 and then for display or as the second light portion 24 for illumination.

The controllable polarization rotator 40 may comprise any suitable component or components to controllably rotate the polarization of the light from the polarizer 38. In some examples the polarization rotator 40 may be controllable using an applied field such as an electric field. For example, the controllable polarization rotator 40 may comprise a liquid crystal plate and/or a switchable waveplate such as a half wave waveplate and/or a lambda/4 switch where lambda refers to the wavelength of light from the light source 12.

In examples the polarization controller 36 may comprise any suitable component or components. For example the polarization controller 36 may comprise a plurality of different polarizers 38 that may be switched into the light path of light incident upon the input transmission polarizer 16 to selectively control the polarization of the light incident upon the input transmission polarizer 16.

The polarization recycler 46 may be configured to receive light from the light source 12 and to provide light to the polarization controller 36, which in the example of FIG. 2 comprises the polarizer 38 and the controllable polarization rotator 40.

In some examples, the polarization recycler 46 is also configured to receive returned light from the polarization controller 36, for example light having the polarization not transmitted by the polarizer 38, and to recycle at least a portion of the returned light. For example the polarization recycler 46 may recycle at least a portion of the returned light to have the selected polarization, for example light having the polarization transmitted by the polarizer 38.

The polarization recycler 46 may be configured to maximize the amount of light from a light source 12 having a selected polarization and therefore the amount of light incident upon the polarizing beam splitter 18 having the selected polarization.

In examples, the polarization recycler 46 and the polarization controller 36 may be configured to maximize the amount of light from the light source 12 provided as the second light portion 24 for illumination or the first light portion 20 to the pixel control element 14 and for display.

In examples, the polarization recycler 46 may comprise any suitable component or components. For example an integrator light pipe or rod with polarization recycling implemented with, for example, a quarter wave plate and mirror.

In some examples, the control mechanism 30 is configured to receive the second light portion 24 as input and to control how much of the second light portion 24 is provided for illumination. In examples the control mechanism 30 may be considered a light transmission controller, a controllable aperture and/or a light blocking apparatus.

In some examples, the control mechanism 30 may be configured to control the transmission ratio of the second light portion 24. For example, the control mechanism 30 may be configured to block and/or absorb and/or redirect and/or reflect at least part of the second light portion 24.

In some examples, the control mechanism 30 may be configured to transmit all or none of the second light portion 24 for illumination. In other examples, the control mechanism 30 may be configured to selectively control the transmission of the second light portion 24 on a continuous scale from 0% to an upper limit greater than 0%, for example 100%.

The control mechanism 30 may comprise any suitable component or components. For example, the control mechanism 30 may comprise a liquid crystal shutter such as an adjustable liquid crystal shutter and/or a mechanical shutter or aperture and so on.

In use, the light source 12 produces light which enters the polarization recycler 46. The light passes through the polarization recycler 46 to the polarizer 38.

The polarizer 38 polarizes the light from the light source 12. In examples such as the example of FIG. 2, the polarizer 38 polarizes the light from the light source 12 into the first polarization of the polarizing beam splitter 28.

Light having the selected polarization passes to the controllable polarization rotator 40 and light having the unselected polarization is returned to the polarization recycler 46.

The polarization recycler 46 recycles at least a portion of the returned light and outputs the recycled light to the polarizer 38.

In examples such as the example of FIG. 2, the controllable polarization rotator 40 is controlled to either allow the light from the polarizer 38 to pass to the polarizing beam splitter 28 with the first polarization or to rotate the polarization of the light from the polarizer 38 to the second polarization of the polarizing beam splitter 28.

When the controllable polarization rotator 40 outputs light with the first polarization, the polarizing beam splitter 28 provides the light as the first light portion 20 as input to the pixel control element 14. That is, in examples where the incident light 18 upon the polarizing beam splitter 28 is polarized in the first polarization, the first light portion comprises all of the incident light 18.

When the polarization rotator 40 rotates the polarization of the light from the polarizer 38 to have the second polarization of the polarizing beam splitter and outputs light having the second polarization, the polarizing beam splitter 28 outputs the incident light 18 as the second light portion 24 for illumination. In examples where the incident light 18 upon the polarizing beam splitter 28 is polarized in the second polarization, the second light portion 24 comprises all of the incident light.

In some examples, when light is output from the polarizing beam splitter 28 as a second light portion 24, the control mechanism 30 may control the transmission ratio of the second light portion 24.

For example, the second light portion 24 may be used in some examples as a flashlight. In such examples, the control mechanism 30 may control whether the flashlight is on or off and/or control brightness of the flashlight.

In some examples, the polarization controller 36 may be configured to control the polarization of the light from the light source 12 in synchronization with the pixel control element 14. For example the polarization controller 36 may be configured to control the polarization of the light from the light source 12 in synchronization with the duty cycle of the pixel control element 14.

That is, in some examples light may be provided as the first light portion 20 to the pixel control element 14 when the pixel control element 14 needs the input light but otherwise the light may be provided as the second light portion and output for illumination.

In some examples, the pixel control element 40 may operate without incident light all of the time. For example, the pixel control element 14 may have a duty cycle of 40% or less which means that 60% of the time light from the light source 12 may be output for illumination.

The polarization controller 36 may be controlled to provide light to the polarizing beam splitter 28 in the first polarization when the pixel control element 40 requires the light but otherwise may provide light in the second polarization to the polarizing beam splitter 28 to allow the light to be output as a second light portion 24 to be used for illumination.

In general, the polarization controller 36 may control the polarization of the light incident upon the input transmission polarizer 16 to control when the light is provided as the first light portion 20 or the second light portion 24.

In some examples, one or more of the components illustrated in FIG. 2 may be omitted. For example, one or more of the polarization recycler 46, the polarizer 38, the controllable polarization rotator 40 and the control mechanism 30 may be omitted.

In examples, the apparatus 10 may comprise a number of additional components not illustrated in the example of FIG. 2.

In examples, there may be any number of intervening components between the components illustrated in the example of FIG. 2, including no intervening components.

Additionally or alternatively one or more of the components illustrated in the example of FIG. 2 may be integrated and/or combined with one or more components illustrated and/or additional components not illustrated in the example of FIG. 2.

FIG. 3 schematically illustrates a further example of an apparatus 10.

In the example of FIG. 3, the apparatus 10 comprises some components of the apparatus 10 described in relation to FIGS. 1 and 2 and comprises additional components. The components of FIG. 3 may be as described above in relation to FIGS. 1 and/or 2.

In the example of FIG. 3, the apparatus 10 comprises a near eye display 56. The apparatus 10 of FIG. 3 further comprises a light collimating and recycling lens set 58, image lenses 60, a mirror prism 62 and an exit pupil expander 64.

In the example of FIG. 3, the pixel control element comprises a reflective microdisplay. In FIG. 3 the reflective microdisplay 48 is a liquid crystal on silicone (LCOS) display.

In FIG. 3, the input transmission polarizer 16 comprises a polarizing beam splitter 28.

The light collimating and recycling lens set 58 is configured to receive light from the light source 12 and to provide light to the polarizing beam splitter 28. The light collimating and recycling lens set 58 is configured to collimate light from the light source 12 and to recycle light returned to it by other component(s) of the apparatus 10. The light collimating and recycling lens set 58 may comprise any suitable component or components.

In examples, such as the example of FIG. 3, the image lenses 60 are configured to receive light from the polarizing beam splitter 28 and to adjust the light from the polarizing beam splitter 28. For example, the image lenses 60 may project the image produced at the pixel control element 14 and/or may zoom the image produced at the pixel control element 14 and/or may adjust the focus of the image produced at the pixel control element 14 and so on. The image lenses 60 may comprise any suitable component or components.

The mirror prism 62 is configured to receive light from the image lenses 60 and to redirect the light towards the exit pupil expander 64. The mirror prism 62 may comprise any suitable component or components.

The exit pupil expander 64 is configured to receive light from the mirror prism 62 and to provide light to an eye or eyes of a user. The exit pupil expander 64 may comprise any suitable component or components.

In use, the light source 12 provides light to the light collimating and recycling lens set. The light passes through the light collimating and recycling lens set 58 to the polarizing beam splitter 28. The polarizing beam splitter polarizes the incident light 18 into transmitted first and second light portions 20, 24. The first light portion 20 having a first polarization is provided as input to the reflective microdisplay 48.

The second light portion 24 having a second polarization orthogonal to the first polarization is output for illumination.

In examples, such as the example of FIG. 3, at least part of the light in the first light portion 20 is reflected by the LCOS display. The polarization of the light reflected from each pixel is rotated between 0 and 90° depending on what is displayed on the LCOS pixels.

In the example of FIG. 3, light from a pixel having polarization rotated by 90° passes through the polarizing beam splitter and enters into the image lenses 60. Light from pixels having polarization rotated by 0° is reflected back towards the light source 12 by the polarizing beam splitter 28 and may be recycled in the light collimating and recycling lens set 58.

The light passes through the image lenses 60 and is redirected by the mirror prism 62 into the exit pupil expander 64 which provides the light to an eye or eyes of a user.

In examples, such as the example of FIG. 3, in this way, the image displayed on the reflective microdisplay is transmitted to an eye or eyes of the user.

In addition, the polarized state of the second light portion 24, which is not used by the reflective microdisplay, is used for illumination and is not blocked and/or wasted.

In some examples, one or more of the components illustrated in FIG. 3 may be omitted.

In examples, the apparatus 10 may comprise a number of additional components not illustrated in the example of FIG. 3.

In examples, there may be any number of intervening components between the components illustrated in the example of FIG. 3, including no intervening components.

Additionally or alternatively one or more of the components illustrated in the example of FIG. 3 may be integrated and/or combined with one or more components illustrated and/or additional components not illustrated in the example of FIG. 3.

Figure 4:
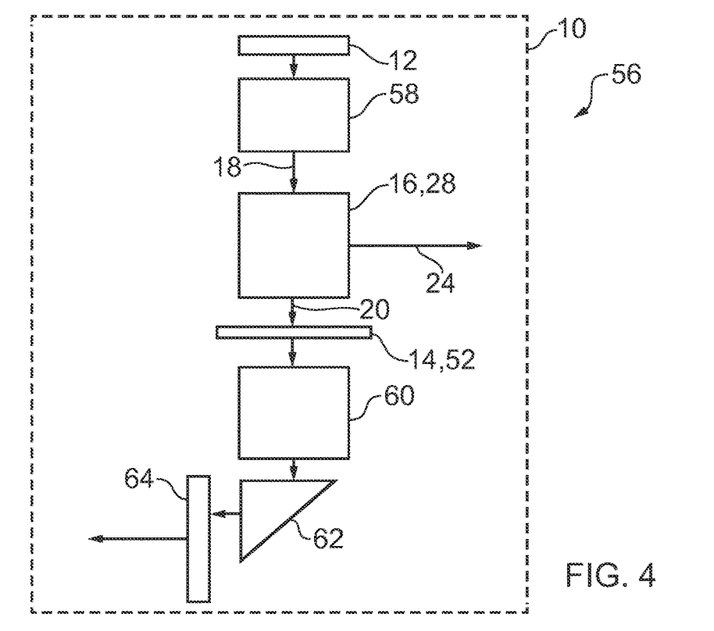
FIG. 4 illustrates an example of an apparatus.

FIG. 4 schematically illustrates a further example of an apparatus 10. In the example of FIG. 4 the apparatus 10 comprises a near-eye display 56.

In the example of FIG. 4, the apparatus 10 comprises components described in relation to FIG. 3. These components may be as described in relation to FIG. 3.

In the example of FIG. 4, the pixel control element 14 comprises a transmissive microdisplay 52. In the example of FIG. 4, the transmissive microdisplay 52 comprises a transmissive liquid crystal microdisplay.

In use, light is produced by the light source 12 and enters the light collimating and recycling lens set 58.

The light passes through the light collimating and recycling lens set 58 to the polarizing beam splitter 28. The polarizing beam splitter 28 provides the first light portion as input to the transmissive microdisplay 14 and the second light portion is output to be provided for illumination.

The first light portion 20 passes through the transmissive microdisplay 52. The pixels of the transmissive microdisplay 52 selectively rotate the polarization of the first light portion 20 depending upon what is displayed on the transmissive microdisplay 52.

The light passes through the image lenses 60 and is redirected by the mirror prism 62 to the exit pupil expander 64.

The exit pupil expander 64 provides the light to an eye or eyes of the user. In examples, such as the example of FIG.

4, in this way, the image displayed on the transmissive microdisplay is transmitted to an eye or eyes of the user.

In addition, the polarized state of the second light portion 24, which is not used by the transmissive microdisplay, is used for illumination and is not blocked and/or wasted.

In some examples, one or more of the components illustrated in FIG. 4 may be omitted.

In examples, the apparatus 10 may comprise a number of additional components not illustrated in the example of FIG. 4.

In examples, there may be any number of intervening components between the components illustrated in the example of FIG. 4, including no intervening components.

Additionally or alternatively one or more of the components illustrated in the example of FIG. 4 may be integrated and/or combined with one or more components illustrated and/or additional components not illustrated in the example of FIG. 4.

The use of the second light portion for illumination provide additional functionality to apparatuses such as near-eye displays 58 illustrated in the examples of FIGS. 3 and 4 at little or no extra cost.

In addition, examples of the disclosure allow for a user to avoid wearing separate smart eyewear and head lamp, for example, which can be uncomfortable and difficult, or even impossible, to wear and operate together.

FIG. 5 illustrates an example of a method 500.

At block 502 a light source is provided. The light source 12 may be any suitable light source 12 and may be provided using any suitable method.

For example, the light source 12 may be as described above and in relation to FIGS. 1 and/or 2.

At block 504 a pixel control element 14 is provided.

The pixel control element 14 may be any suitable pixel control element 14 and may be provided using any suitable method. For example, the pixel control element 14 may be as described above in relation to FIGS. 1 and/or 2.

At block 506 an input transmission polarizer 16 is provided.

The input transmission polarizer 16 may be any suitable input transmission polarizer 16 and may be provided by any suitable method. For example, the input transmission polarizer 16 may be as described above in relation to FIGS. 1 and/or 2.

The input transmission polarizer may be configured to polarize incident light 18 from the light source 12 into transmitted first and second light portions 20, 24, wherein the first light portion 20 has a first polarization and the second light portion 24 has a second polarization wherein the first and second polarizations are orthogonal. The input transmission polarizer 16 may also be configured to provide the first light portion 20 as input to the pixel control element 14 and to output the second light portion 24 to provide the second light portion 24 for illumination.

The input transmission polarizer 16 may be configured to polarize incident light 18 to simultaneously provide the first and second light portions 20, 24.

In some examples, the method 500 may further comprise providing a polarization recycler 46 and/or a polarization controller 36 and/or a control mechanism 30. The polarization recycler 46 and/or polarization controller 36 and/or control mechanism 30 may comprise any suitable component or components and may be provided by any suitable method. For example, the polarization recycler 46 and/or polarization controller 36 and/or control mechanism 30 may be as described above in relation to FIG. 2.

In some examples, the method may comprise providing one or more of the components illustrated in the examples of FIGS. 3 and/or 4. The components may be provided using any suitable method.

The blocks illustrated in FIG. 5 may represent steps in a method. The illustration of a particular order to the blocks does not necessarily imply that there is a required or preferred order for the blocks and the order and arrangement of the block may be varied. Furthermore, it may be possible for one or more blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the disclosure have been described in the preceding paragraphs with reference to various examples, it should be appreciated that modifications to the examples given can be made without departing from the scope of the invention as claimed. For example, the apparatus 10 may comprise a plurality of light sources 12. The light sources 12 may be the same or different light sources.

Additionally or alternatively the apparatus 10 may comprise a plurality of pixel control elements 14. The pixel control elements 14 may be the same or different pixel control elements.

As used herein 'all' may mean 'substantially all'.

As used herein 'component' may mean 'optical component'.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    a light source;
    a pixel control element; and
    an input transmission polarizer configured to:
    polarize incident light from the light source into transmitted first and second light portions, wherein the first light portion has a first polarization and the second light portion has a second polarization and wherein the first and second polarizations are orthogonal;
    provide the first light portion as input to the pixel control element, wherein the pixel control element is configured to rotate the polarization of the first light portion based on what is displayed on at least one pixel of the pixel control element; and
    output the second light portion to provide the second light portion for illumination, wherein the second light portion is output for illumination external to the apparatus.

2. The apparatus as claimed in claim 1, wherein the input transmission polarizer comprises a polarizing beam splitter.

3. The apparatus as claimed in claim 1, wherein the input transmission polarizer is located between the light source and the pixel control element.

4. The apparatus as claimed in claim 1, further comprising a control mechanism configured to receive the second light portion as an input and to control the transmission ratio of the second light portion.

5. The apparatus as claimed in claim 4 wherein the control mechanism comprises a liquid crystal shutter.

6. The apparatus as claimed in claim 1, further comprising a polarization controller configured to receive light from the light source as an input and to selectively output light having the first or second polarization as an input to the input transmission polarizer.

7. The apparatus as claimed in claim 6, wherein the polarization controller comprises a polarizer and a controllable polarization rotator.

8. The apparatus as claimed in claim 7, wherein the polarization rotator comprises a liquid crystal plate.

9. The apparatus as claimed in claim 6 wherein the polarization controller is configured to be controlled in synchronization with the duty cycle of the pixel control element.

10. The apparatus as claimed in claim 7 further comprising a polarization recycler configured to receive light returned from the polarization controller and to recycle at least a portion of the returned light and output the recycled light to the polarization controller.

11. The apparatus as claimed in claim 1 wherein the pixel control element comprises a reflective microdisplay.

12. The apparatus as claimed in claim 1, wherein the pixel control element comprises a transmissive microdisplay.

13. The apparatus as claimed in claim 1, wherein the apparatus comprises a near-eye display.

14. A method comprising:
    providing a light source;
    providing a pixel control element; and
    providing an input transmission polarizer configured to:
    polarize incident light from the light source into transmitted first and second light portions, wherein the first light portion has a first polarization and the second light portion has a second polarization and wherein the first and second polarizations are orthogonal;
    provide the first light portion as input to the pixel control element, wherein the pixel control element is configured to rotate the polarization of the first light portion based on what is displayed on at least one pixel of the pixel control element; and
    output the second light portion to provide the second light portion for illumination, wherein the second light portion is output for illumination external to the apparatus.

15. The method of claim 14, wherein the input transmission polarizer comprises a polarizing beam splitter.

16. The method of claim 14, wherein the input transmission polarizer is located between the light source and the pixel control element.

17. The method of claim 14, further comprising
    providing a control mechanism configured to receive the second light portion as an input and to control the transmission ratio of the second light portion.

18. The method of claim 17, wherein the control mechanism comprises a liquid crystal shutter.

19. The method of claim 14, wherein the pixel control element comprises a reflective microdisplay.

20. The method of claim 14, wherein the pixel control element comprises a transmissive microdisplay.

* * * * *